Sept. 6, 1960  J. GRUSSEN  2,951,628
CONTAINER FOR FLUID OR PULVERULENT MATERIAL
AND PROCESS FOR MAKING IT
Filed Nov. 19, 1956
FIG. 1
FIG. 2
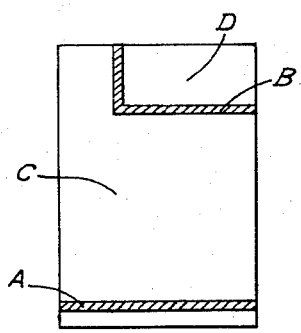
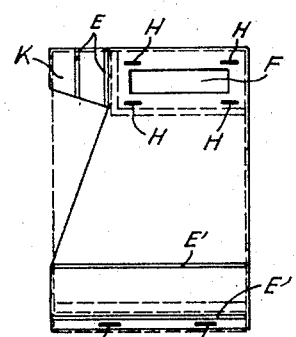
FIG. 3    FIG. 4    FIG. 5
 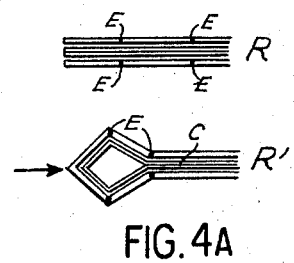 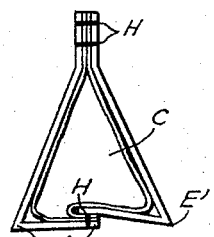
FIG. 4A
FIG. 6    FIG. 7
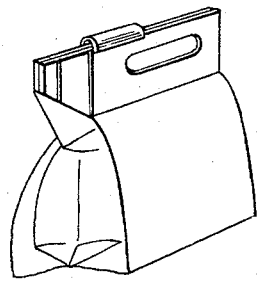 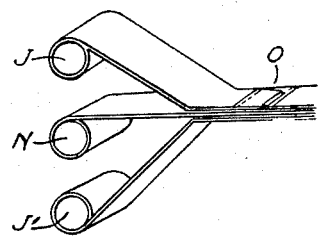
INVENTOR
Jean Grussen
By
ATTORNEYS United States Patent Office 2,951,628
Patented Sept. 6, 1960

2,951,628
CONTAINER FOR FLUID OR PULVERULENT MATERIAL AND PROCESS FOR MAKING IT

Jean Grussen, 47 Blvd. Richard Lenoir, Paris, France

Filed Nov. 19, 1956, Ser. No. 622,934

Claims priority, application France Nov. 21, 1955

5 Claims. (Cl. 229—55)

Several types of bag-like containers made from a plastic tubular element are known in which closing is effected by merely welding such containers edge-to-edge when filled. Some of said containers are based on a valve means as described in the French Patents 1,073,363, filed on September 6, 1952, and 1,103,450, filed on April 12, 1954. Said valve means require for construction thereof long and sometimes difficult assemblies, and on the other hand stock thickness differences, particularly at the valve welding, are not always satisfactory. Also, use does not always prove practical; in fact, it is necessary to introduce a conduit into the valve to drain the container; then again the bag-like container cannot maintain itself upright.

It is a primary object of this invention to obviate the above-mentioned different drawbacks.

A feature of this invention consists in dividing the bag or container into two distinct parts by means of a L-shaped welding.

Another feature of this invention consists in sandwiching the bag, i.e. fixing two thin similar semi-rigid parts having the same dimension as the bag itself at predetermined locations on opposed front and back faces thereof.

Said parts, owing to the particular arrangement of their appropriate fastenings, cut forms, recesses and grooves combine together to provide:

A protective cover for the bag which, accordingly, may be made from a thin stock;

A handling grasp, and

An instantaneous spreading device for the bag edges of a predetermined area or zone.

The fastening point arrangement and the grooving of the aforesaid semi-rigid parts covering the bag or container are so calculated that when one fills the bag the bag distortion causes folds at the grooves, whereby the bag is turned into a triangular prism capable of maintaining itself upright.

Another object of this invention is a continuous process for making said bag or container.

To put the invention into practice it may be used with any form of existing container made of plastic material as well as so-called "compound" materials. Said "compound" materials are mutually assembled and reinforced materials. In the case of plastic material it is preferable to start from the sheath.

Several exemplary forms of the present invention will be now described, only illustrative and without any limitation of the scope of the invention, as described in the appended claims, and schematically shown in the annexed drawings.

In the drawings:

Fig. 1 is a front view of a bag or container lying flat and divided into two parts by the L-shaped welding.

Fig. 2 is a front view of the semi-rigid part or element which covers the bag.

Fig. 3 is a vertical section of the sandwich comprising both semi-rigid parts with the container disposed therebetween.

Fig. 4 is a top view of the bag or container representing its normal position and Figure 4A is a top view representing its open position with the part for the filling open.

Fig. 5 is a section of the bag or container filled and disposed on a flat surface.

Fig. 6 shows the same in perspective view, and

Fig. 7 shows schematically a continuous process for making the bag or container according to the invention.

In Fig. 1, A represents the welding of the container bottom; B indicates the L-shaped welding dividing the container into two separate parts; C represents the container proper; and, D indicates a part free from any contact with the container content.

After having constructed the container according to the aforesaid weldings the same is sandwiched between two semi-rigid sheets which may be a plastic material, a kraft paper or any other coated material, enamelled or not, as well as a material so-called "compound," etc.

One of these two parts having the same dimensions as the container is shown in Fig. 2. Such parts need to be disposed so that the part F, which is recessed, registers with the part D of the container in Fig. 1. Said recess, which will be also effected in the container, is used in handling the container, introducing therein, for example, the fingers of the hand with exception of the thumb.

Once both semi-rigid sheets are in position, the fastening thereof which is represented by H in Fig. 2 registers with the part D of the container shown in dash-and-dot line in Fig. 2 and the welding A or below. Such fastenings may extend through the container and be clasps or clips, eyelets or be merely stuck or welded.

Conversely, the part K in Fig. 2 should be stuck or welded to the container, without however welding or sticking the walls of the container proper, so as not to close this part designed for filling and draining. Alternately, the container could be slightly extended at this location and edges thereof folded back on each semi-rigid wall in order to fasten them by any appropriate means, as by welding, sticking, or the like.

In order to illustrate the distortion, designed for opening the container, of the part K, Fig. 4 shows such part as seen from top thereof; R in a closed position, and R' when a pressure has been applied in the direction as indicated by the arrow, so that the container is open. The grooves E in Fig. 4 define the shape of the opening. It is to be noted that both semi-rigid parts in Fig. 2 comprise a re-entrant portion under the part K to facilitate this distorion.

So far as sealing of the bag or container when filled is concerned, the operator will make a mere welding in part K to seal the container. The bag is opened by breaking of such welding.

In order to close again the container in use, a small clamping element is provided straddling the unit, and user will merely slide such element in a runner-like manner to open or close the container. Said element is shown at the top of the container shown in perspective Fig. 6.

The grooves E' shown in Fig. 2 are designed to facilitate folding. In effect, when the container is filled with a fluid or pulverulent material, there takes place a distortion of the container which draws the extremities thereof towards its center. Thus, the grooves E' turn the bag or container into a triangle shaped prism shown in perspective in Fig. 5 and in section in Fig. 6. Thus, the container after filling maintains itself upright.

Of course, it is possible to construct the container or bag by covering the same with a single semi-rigid part which would thus straddle the top or the bottom, without modifying in any way the features of this invention.

Fig. 7 shows schematically a continuous process for making the bag or container according to this invention, There are provided two rolls J and J' made of a semi-rigid material, and a sheath N made of plastic material, all joined together as indicated by the reference O, said sheath N being interposed between said rolls. According to the process of this invention, the container is fabricated automatically, since welding, clasping, recessing and grooving operations can be made simultaneously.

What I claim is:

1. A container for a pourable material comprising a thin flexible bag consisting of two opposed sides connected together along their lateral edges and bottom, the uppermost portions of said sides being sealed together for the greater part of their width along an L-shaped line having a first arm extending inwardly from one lateral edge a part of the way toward the other and a second arm extending upward from the inner end of said first arm to the upper edge of the bag, and semi-rigid reinforcing members fixed to the upper portion of each side of said bag, one portion of each reinforcing member being stuck to that portion of each bag side lying between said second arm and the lateral edge of said bag remote from said first arm and being creased along at least two laterally spaced lines parallel to said remote edge, so as to permit said reinforcing member portions to bend at said creases and bulge outwardly to form a pouring spout when lateral pressure is exerted against said last mentioned lateral edge.

2. A container as claimed in claim 1 in which said reinforcing members and bag sides are apertured in the area bounded by the two arms of said L-shaped line, the bag top and one lateral edge, thereby forming a handle for said container.

3. A container as claimed in claim 2 in which said reinforcing members extend to and are connected together at the bottom of the bag, said reinforcing members being cut back below said spout forming portion to facilitate its being bent into a spout.

4. A container as claimed in claim 3 in which said reinforcing members are creased along lines parallel to and near said bag bottom, so that when said container is sat upright said reinforcing members bend along said last mentioned creases to create a flat bottom for the container.

5. A container as claimed in claim 1 provided with a slide adapted to grip the upper edges of the spout forming portions of said reinforcing members to close said container.

References Cited in the file of this patent

UNITED STATES PATENTS

| | | |
|---|---|---|
| 1,410,404 | Haines | Mar. 21, 1922 |
| 1,744,285 | Taylor | Jan. 21, 1930 |
| 2,336,503 | Ringler | Dec. 14, 1943 |
| 2,777,574 | Brody | Jan. 15, 1957 |
| 2,804,257 | Hasler et al. | Aug. 27, 1957 |

FOREIGN PATENTS

| | | |
|---|---|---|
| 126,917 | Sweden | Oct. 13, 1949 |
| 730,235 | Great Britain | May 18, 1955 |
| 759,886 | Great Britain | Oct. 24, 1956 |